US012568050B2

(12) United States Patent
Zhou et al.

(10) Patent No.: US 12,568,050 B2
(45) Date of Patent: Mar. 3, 2026

(54) ADAPTIVE ADJUSTMENT METHOD OF PACKET-LEVEL TRANSMISSION PRIORITY FOR DELAY GUARANTEE IN PROGRAMMABLE NETWORKS

(71) Applicants: ZHEJIANG UNIVERSITY, Hangzhou (CN); ZHEJIANG LAB, Hangzhou (CN)

(72) Inventors: Haifeng Zhou, Hangzhou (CN); Di Wang, Hangzhou (CN); Xiang Chen, Hangzhou (CN); Zhengyan Zhou, Hangzhou (CN); Chunming Wu, Hangzhou (CN); Wenhai Wang, Hangzhou (CN)

(73) Assignees: ZHEJIANG UNIVERSITY, Hangzhou (CN); ZHEJIANG LAB, Hangzhou (CN)

( * ) Notice: Subject to any disclaimer, the term of this patent is extended or adjusted under 35 U.S.C. 154(b) by 46 days.

(21) Appl. No.: 18/777,619

(22) Filed: Jul. 19, 2024

(65) Prior Publication Data

US 2025/0286824 A1 Sep. 11, 2025

(30) Foreign Application Priority Data

Mar. 8, 2024 (CN) .......................... 202410266072.4

(51) Int. Cl.
*H04L 47/32* (2022.01)
*H04L 47/2483* (2022.01)
*H04L 47/6275* (2022.01)

(52) U.S. Cl.
CPC .......... *H04L 47/32* (2013.01); *H04L 47/2483* (2013.01); *H04L 47/6275* (2013.01)

(58) Field of Classification Search
CPC .. H04L 47/32; H04L 47/2483; H04L 47/6275
See application file for complete search history.

(56) References Cited

U.S. PATENT DOCUMENTS 11,252,079 B2 * 2/2022 Michael .................. H04L 45/30
11,621,922 B2 * 4/2023 Joung ................. H04L 47/2425
370/235

* cited by examiner

*Primary Examiner* — G. C. Neurauter, Jr.
(74) *Attorney, Agent, or Firm* — Wiersch Law Group

(57) ABSTRACT

An adaptive adjustment method of packet-level transmission priority for delay guarantee in programmable networks. The method realizes the adaptive adjustment of packet-level transmission priority in programmable networks from three aspects to satisfy the preset transmission delay requirements, namely: adaptive adjustment of priority in programmable switches based on processing delay state and switch queuing state, adaptive adjustment of priority among programmable switches based on transmission delay in upstream switches, and adaptive adjustment of global parameters based on packet transmission delay satisfaction, so as to realize the packet-level transmission delay guarantee in different positions with different time scales. In addition, for a scene with a large number of time-sensitive flows, based on the optimization model and heuristic algorithm, the optimization deployment of time-sensitive flows can be realized in polynomial time under the condition of limited network resources to improve the overall extent of delay satisfaction.

10 Claims, 6 Drawing Sheets

ADAPTIVE ADJUSTMENT METHOD OF PACKET-LEVEL TRANSMISSION PRIORITY FOR DELAY GUARANTEE IN PROGRAMMABLE NETWORKS

CROSS-REFERENCE TO RELATED APPLICATIONS

The present application claims priority to Chinese Patent Application No. 202410266072.4, filed on Mar. 8, 2024, the content of which is incorporated herein by reference in its entirety.

TECHNICAL FIELD

The present disclosure relates to the technical field of software-defined network real-time transmission, and in particular, to an adaptive adjustment method of packet-level transmission priority for delay guarantee in programmable networks.

BACKGROUND

With the emergence and rapid development of various new network applications such as Virtual Reality (VR), Augmented Reality (AR), Industrial Internet, and Metauniverse, the importance of transmission delay guarantee is increasing. Transmission delay guarantee has been a long-term challenge for networks, for example in Software-Defined Networking (SDN) and programmable networks. Current methods for achieving delay guarantee mainly include:

(1) Congestion control: focusing on avoiding and alleviating network congestion for all flows, rather than ensuring the transmission delay of specific flows.

(2) Queue scheduling: all packets are processed in the same manner, making it unable to handle packets with different delay requirements. Moreover, most of the implementation solutions in this method require additional hardware switching requirements, greatly limiting its applicability.

(3) Re-routing planning based on Quality of Service (QOS): when the original routing path fails to satisfy the delay requirements, the original route will be converted into a new route. However, a new route is not always available, and changes in the transmission process inevitably caused traffic fluctuations, especially in the case of large traffic, which significantly affects network QoS.

(4) Fixed transmission priority adjustment mechanism: a common transmission priority is assigned to packets of the data flow based on the data flow type, and the corresponding transmission service is achieved by setting different transmission priorities for different data flows. However, the fixed transmission priority cannot be changed according to the real-time network traffic, thus failing to satisfy the specific transmission delay requirements.

At the same time, the current delay guarantee methods mostly adjust the packet priority based on the communication between the control plane and the data plane. After the control plane obtains the transmission information of the data plane, a judgment is made based on the above adjustment algorithm, and then the modified priority is sent to the data plane. This process introduces a high communication delay and cannot adjust the packet transmission priority in real time based on the network status.

To sum up, transmission delay guarantee remains a challenging task. How to provide a more reliable and rapid transmission delay guarantee mechanism for network time-sensitive flows on the basis of existing programmable networks is an urgent research problem.

SUMMARY

In view of the shortcomings of the prior art, the object of the present disclosure is to provide an adaptive adjustment method of packet-level transmission priority for delay guarantee in programmable networks.

In a first aspect, an embodiment of the present disclosure provides setting a transmission protocol and a control protocol so as to record and transmit data in a data packet transmission process.

Configuring an intra-programmable switch priority adaptive adjustment mechanism, an inter-programmable switch priority adaptive adjustment mechanism and a global parameter adaptive adjustment mechanism, so as to collaboratively implement packet-level transmission delay guarantee in different locations in a programmable network with different time scales.

The intra-programmable switch priority adaptive adjustment mechanism includes: acquiring current data packet transmission state of the current data flow and a queue queuing situation based on the control protocol, and transmitting the data packet transmission state and the queue queuing situation from the egress pipeline of programmable switches to the ingress pipeline, so as to adaptively adjust a transmission priority of a data packet in the data flow inside the programmable switches.

The inter-programmable switch priority adaptive adjustment mechanism includes: acquiring historical transmission data including the cumulative transmission delay and the transmission priority during the data packet transmission process based on the transmission protocol; and when the data packet arriving at a downstream switch, comparing the cumulative transmission delay with a cumulative transmission delay threshold, so as to adaptively adjust the transmission priority of each data packet among the programmable switches.

The global parameter adaptive adjustment mechanism includes: calculating a cumulative overall delay satisfaction rate of transmitted data packets in the current data flow at the egress pipeline of a last hop switch on a data flow transmission path; at the same time, counting the transmission delay of each data packet on each hop programmable switch; and thereby adaptively adjusting the initial priority of the current data flow and expected delay of the current data flow in each hop programmable switch.

In a second aspect, an embodiment of the present disclosure provides an electronic device, including a memory and a processor. The memory is coupled with the processor and configured to store program data. The processor is configured to execute the program data to implement the adaptive adjustment method of packet-level transmission priority for delay guarantee in programmable networks.

In a third aspect, an embodiment of the present disclosure provides a non-transitory computer-readable storage medium, on which a computer program is stored, and when the program is executed by a processor, the above-mentioned adaptive adjustment method of packet-level transmission priority for delay guarantee in programmable networks is implemented.

The present disclosure has the beneficial effects that the present disclosure discloses an adaptive adjustment method of packet-level transmission priority for delay guarantee in programmable networks, which realizes the adaptive adjustment of packet-level transmission priority of a programmable network from three aspects to satisfy the given transmission delay requirements, namely: adaptive adjustment of priority in programmable switches based on packet processing delay and switch queuing, adaptive adjustment of priority among programmable switches based on packet transmission delay in upstream switches, and adaptive adjustment of global parameters based on packet transmission delay satisfaction, so as to realize the packet-level transmission delay guarantee in different positions with different time scales. Due to the adaptive adjustment method, the transmission priority adjustment of the data packets can be carried out in real time, such that key data packets in the data packets in the programmable network can be preferentially transmitted, and network congestion and packet loss rate are reduced, thereby improving the performance and efficiency of the programmable network. In addition, for a scene with a large number of time-sensitive flows, based on the optimization model and heuristic algorithm, the optimization deployment of time-sensitive flows can be realized in polynomial time under the condition of limited network resources to improve the overall extent of delay satisfaction.

BRIEF DESCRIPTION OF DRAWINGS

In order to explain the technical solution in the embodiment of the present disclosure more clearly, the drawings needed in the description of the embodiment will be briefly introduced below. Obviously, the drawings in the following description are only some embodiments of the present disclosure. For those skilled in the art, other drawings can be obtained according to these drawings without paying creative labor.

DESCRIPTION OF EMBODIMENTS

In the following, the technical solution in the embodiment of the present disclosure will be clearly and completely described with reference to the attached drawings. Obviously, the described embodiment is only a part of the embodiment of the present disclosure, but not the whole embodiment. Based on the embodiments in the present disclosure, all other embodiments obtained by those skilled in the art without creative work belong to the scope of protection of the present disclosure.

It should be noted that features in the following embodiments and implementations can be combined with each other without conflict.

Figure 1:
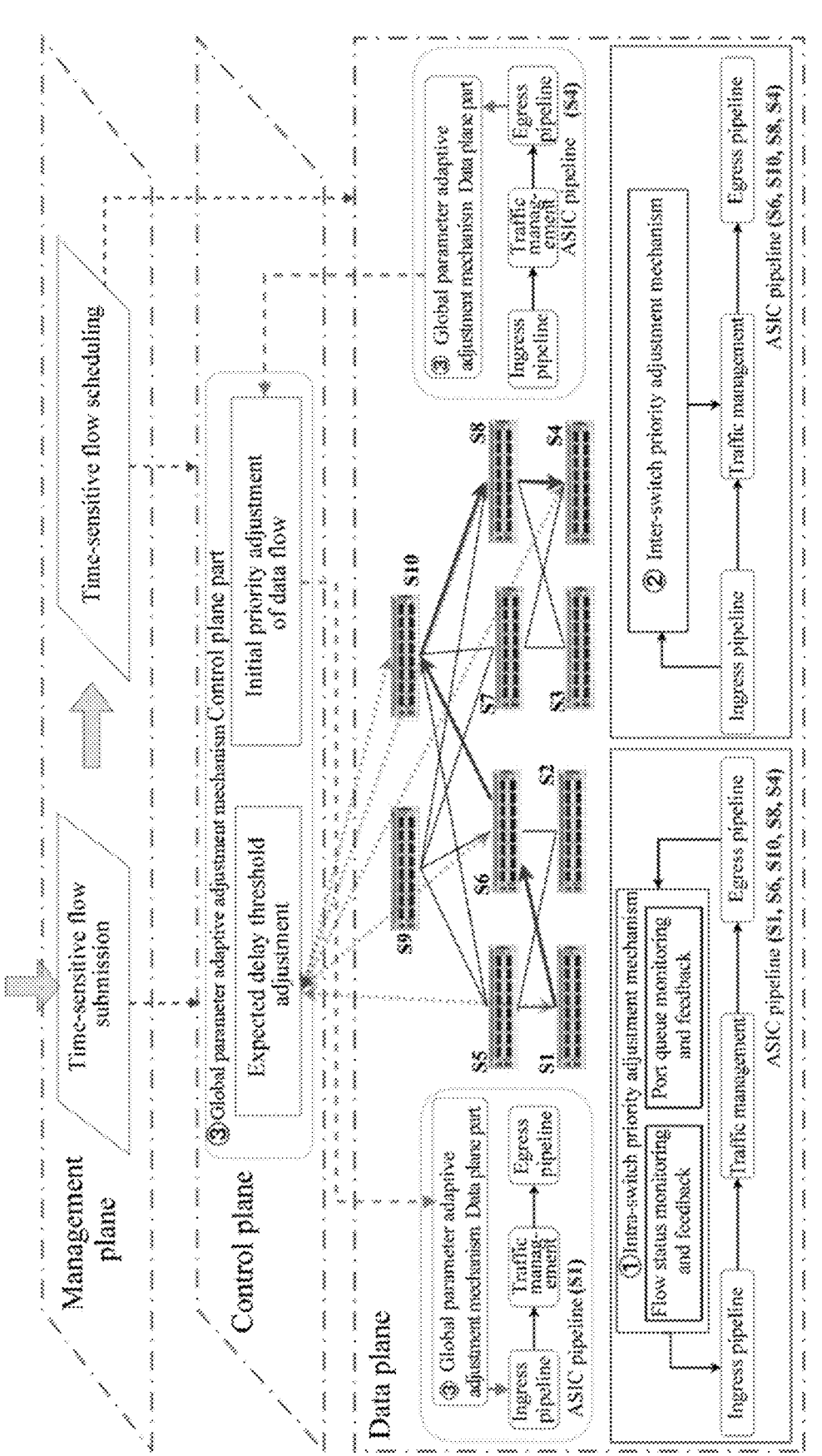
FIG. 1 is a schematic diagram of an adaptive adjustment method of packet-level transmission priority for delay guarantee in programmable networks provided by an embodiment of the present disclosure.

As shown in FIG. 1, the present disclosure provides an adaptive adjustment method of packet-level transmission priority for delay guarantee in programmable networks, which includes:

A transmission protocol and a control protocol are set.

By designing the corresponding supporting transmission protocol and control protocol to record and transmit the data in the process of data packet transmission, and configuring an intra-programmable switch priority adaptive adjustment mechanism, an inter-programmable switch priority adaptive adjustment mechanism and a global parameter adaptive adjustment mechanism, the packet-level transmission delay guarantee can be realized in different locations in the programmable network with different time scales.

Figure 2:
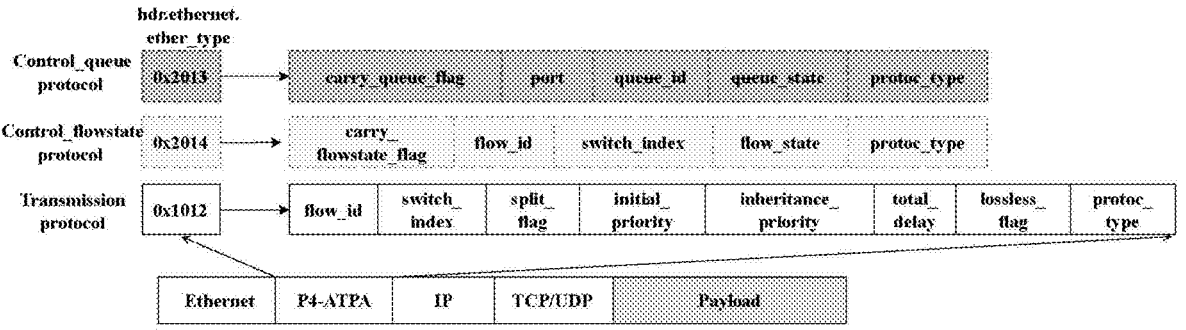
FIG. 2 is a schematic diagram of a transmission protocol and a control protocol provided by an embodiment of the present disclosure.

As shown in FIG. 2, the transmission protocol is a communication protocol for recording and transmitting information during data packet transmission in a programmable network. The transmission protocol includes information such as a data flow identifier flow_id, a switch serial number switch_index in the data flow transmission path, a time-sensitive flow flag split_flag, an initial priority initial_priority, a current priority inherited_priority, a cumulative transmission delay total_delay, a lossless flag lossless_flag, and the next protocol type protoc_type.

In an embodiment, as shown in FIG. 2, the control protocol is a set of communication protocols for transmitting and feeding back judgment signaling and communication status information in a programmable network. The control protocol includes a control queue protocol and a data flow status protocol. The control queue protocol is used for feeding back the queue queuing situation of the current port queue from an ingress pipeline of programmable switches to an egress pipeline, and includes information such as a control queue flag carry_queue_flag, a switch port number port, a queue number queue_id, a queue state queue_state and a next protocol protoc_type. The data flow status protocol is used to record the current data packet transmission state information in the data flow monitored at the egress pipeline of the programmable switches and feed it back to the ingress pipeline of the programmable switches, including a data flow status flag carry_flowstate_flag, a data flow identifier flow_id, a switch serial number switch_index in the transmission path, a flow state flow_state and a next protocol protoc_type and other information.

The intra-programmable switch priority adaptive adjustment mechanism includes: a current data packet transmission state and a queue queuing situation in a current data flow are acquired based on the control protocol, and the data packet transmission state and the queue queuing situation are transmitted from the egress pipeline of the programmable switches to the ingress pipeline, so as to adaptively adjust a transmission priority of the data packet in the data flow in the programmable switches.

Figure 3:
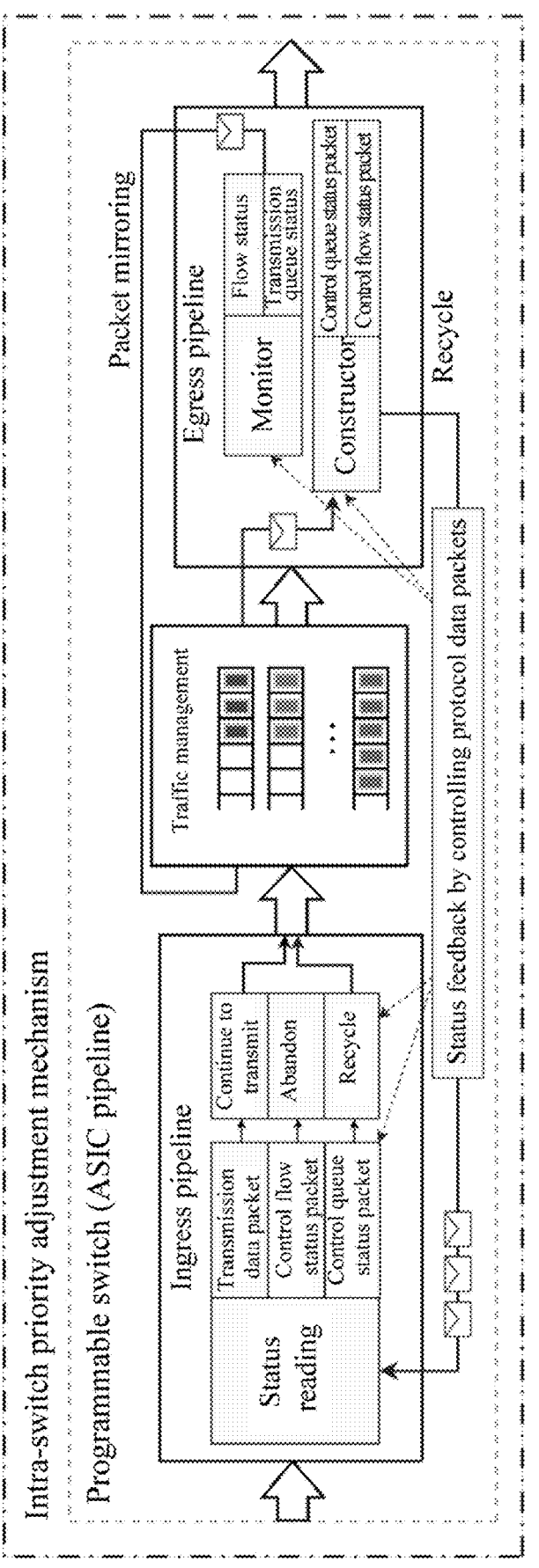
FIG. 3 is a schematic diagram of an intra-programmable switch priority adaptive adjustment mechanism provided by an embodiment of the present disclosure.

As shown in FIG. 3, the process of monitoring the current data flow state includes:

Step S101, the transmission delay of each data packet in the data flow through the ingress pipeline, the traffic management and egress pipeline in the programmable switches are recorded.

Step S102, a transmission delay threshold in the programmable switches corresponding to the data flow is preset.

Step S103, the transmission delay of each data packet is compared with the transmission delay threshold at the egress pipeline of the programmable switches.

When transmission delay of several data packets in the data flow (in this example, the number of data packets is greater than 5) are greater than the transmission delay threshold, the current data packet is mirrored by a monitor configured at the egress pipeline of the programmable switches.

Then embed the data flow status protocol into the mirrored data packet by using a constructor configured at the egress pipeline of the programmable switches. The data packet is transferred from the egress pipeline of the programmable switches to the ingress pipeline, and the current data packet transmission state of the data flow is stored in the corresponding register.

As shown in FIG. 3, the process of monitoring the queue queuing situation of the port queue includes:

S101, the first n data packets are acquired, and the first n data packets are mirrored through the monitor configured at the egress pipeline of the programmable switches, where n is a positive integer, which represents a number of queues.

S102, the mirrored n data packets embed the control queue protocol into the mirrored n data packets by using the constructor configured at the egress pipeline of the programmable switch; and the n data packets are transmitted from the egress pipeline of the programmable switches to the ingress pipeline, and the current queuing situation is stored in the corresponding register.

Further, the n data packets are circulated in the programmable switches via the ingress pipeline, the traffic management and egress pipeline to monitor the current queue queuing situation in real time.

The process of acquiring the current data packet transmission state and queue situation in the current data flow to realize the adaptive adjustment of the data packet transmission priority in the programmable switches includes the following steps:

A subsequent data packet in the current data flow acquires the corresponding current data packet transmission state and current queue queuing situation of the programmable switches at the ingress pipeline.

If the current data packet transmission state of the data flow is high than the transmission delay threshold in the programmable switches, the transmission priority of the current data packet needs to be increased. When the transmission priority of the data packet is increased, it is firstly determined whether a transmission queue to be adjusted is congested, and if the transmission queue to be adjusted is not congested, the current data packet is adjusted to the transmission queue. If the transmission queue to be adjusted is congested, it continues to increase the transmission priority of the current data packet.

If the current data packet transmission state of the data flow is low than the transmission delay threshold in the programmable switches, the transmission priority of the current data packet is correspondingly reduced.

The inter-programmable switch priority adaptive adjustment mechanism is specifically as follows: historical transmission data including a cumulative transmission delay and a transmission priority during the data packet transmission process are acquired based on the transmission protocol. When the data packet arrives at a downstream switch, the cumulative transmission delay is compared with a cumulative transmission delay threshold, so as to adaptively adjust the transmission priority of each data packet among programmable switches.

Further, the historical transmission data includes: a data flow identifier, a switch serial number in the transmission path, a time-sensitive flow flag, an initial priority, a current priority, a cumulative transmission delay, a lossless flag and a next protocol.

In an embodiment, the inter-programmable switch priority adaptive adjustment mechanism includes:

When the data packet enters a first hop programmable switch of the programmable network, the transmission protocol is embedded into the data packet. The historical transmission data of the data packet is updated and recorded in a transmission process. The historical transmission data includes a data flow identifier, a switch serial number on the data flow transmission path, a time-sensitive flow flag, an initial priority, a current priority, a cumulative transmission delay, a lossless flag and a next protocol type.

When the data packet arrives at a next hop programmable switch, the cumulative transmission delay information carried by the transmission protocol in the data packet is compared with the cumulative transmission delay threshold stored in a register. If the cumulative transmission delay is higher than the cumulative transmission delay threshold, the transmission priority of the data packet is increased. At the same time, the queue queuing situation of the queue is read. If the queue is congested, the transmission priority is continuously to be increased until it reaches the highest priority. If the cumulative transmission delay is lower than the cumulative transmission delay threshold, the transmission priority will be reduced accordingly, so as to dynamically increase or decrease the transmission priority of data packets according to the comparison result, and realize the self-adaptive adjustment of the transmission priority of data packets between programmable switches.

An update mode of a cumulative transmission delay field in the transmission protocol includes: cumulative delay update inside the programmable switches and/or cumulative delay update of all processing time including an internal delay and a link delay of the programmable switch.

Figure 4:
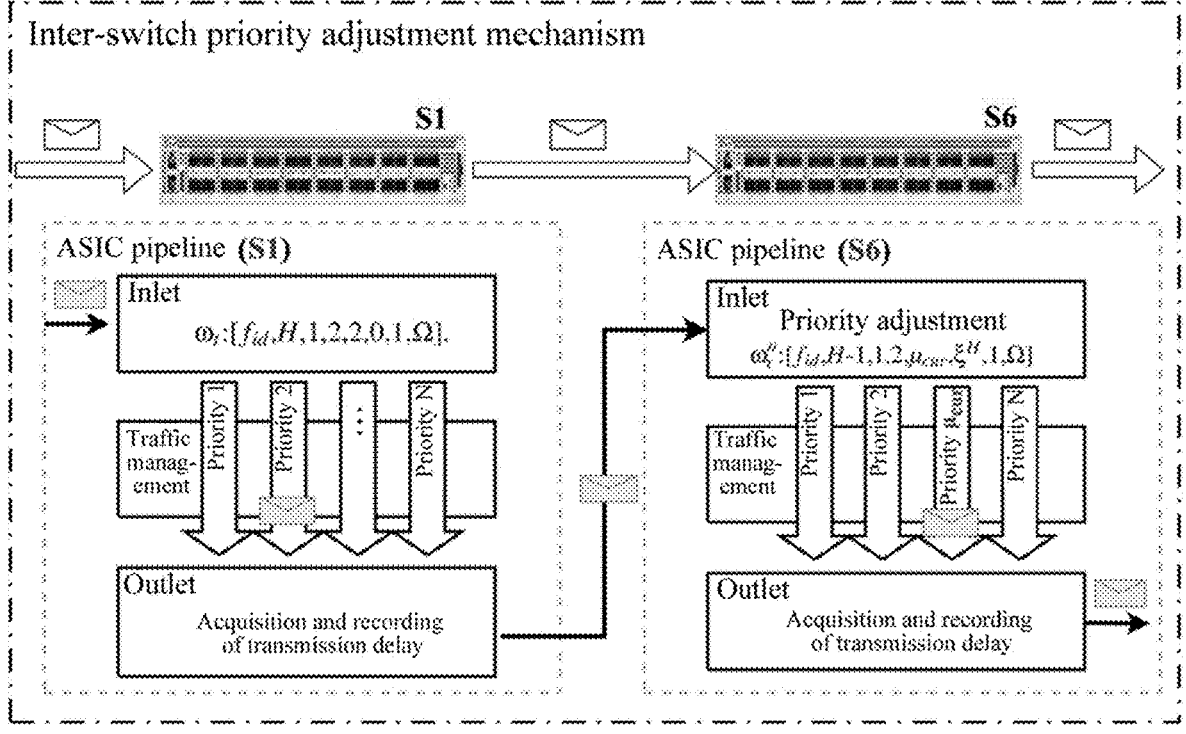
FIG. 4 is a schematic diagram of an inter-programmable switch priority adaptive adjustment mechanism provided by an embodiment of the present disclosure.

In an embodiment, as shown in FIG. 4, when a data packet enters the first hop programmable switch S1 of a programmable network, it embeds the transmission protocol into the data packet, $\omega_t$: [$f_{id}$, H, 1,2,2,0,1, $\Omega$], and updates and records its historical transmission data. In the historical transmission data, the data flow identifier is $f_{id}$, the switch serial number in the transmission path is H, the time-sensitive flow flag is 1, the initial priority is 2, the current priority is 2, the cumulative transmission delay is 0, the lossless flag is 1, and the next protocol is $\Omega$.

When the data packet arrives at the next-hop programmable switch S6, the historical transmission data is updated and recorded, $\omega_t''$:[$f_{id}$, H−1,1,2, $\mu_{cur}$, $\xi^H$, 1, $\Omega$], the data flow identifier is $f_{id}$: the switch serial number in the transmission path is H−1, the time-sensitive flow flag is 1, the initial priority is 2, the current priority is $\mu_{cur}$, the cumulative transmission delay is $\xi^H$, the lossless flag is 2, and the next protocol is $\Omega$.

The global parameter adaptive adjustment mechanism is as follows: a cumulative overall delay satisfaction rate of transmitted data packets in the current data flow is calculated at the egress pipeline of a last hop switch on a data flow transmission path. At the same time, a transmission delay of each data packet on each hop programmable switch is counted, and thereby adaptively adjusting an initial priority of the current data flow and an expected delay of the current data flow in each hop programmable switch.

Figure 5:
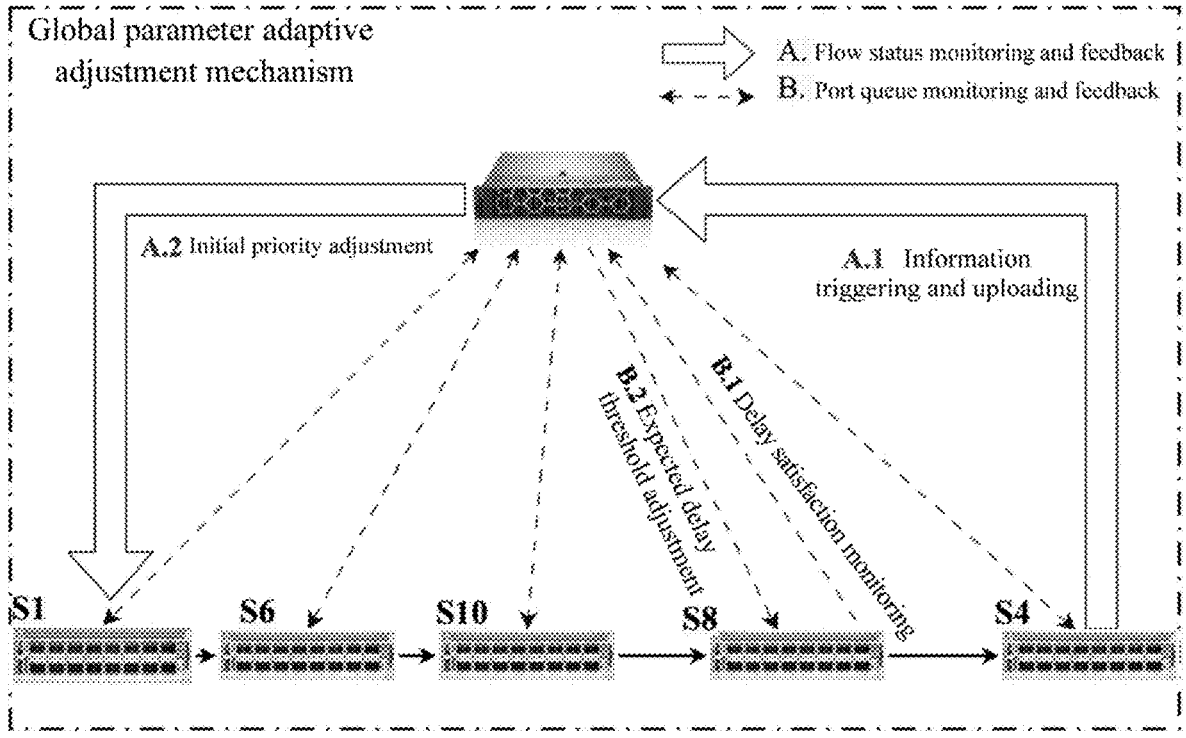
FIG. 5 is a schematic diagram of a global parameter adaptive adjustment mechanism provided by an embodiment of the present disclosure.

In an embodiment, as shown in FIG. 5, a monitor is set at the last hop programmable switch (in this example, the last hop programmable switch is S4) on the transmission path of each data flow to count the transmission delay information of the transmitted data packets in the data flow, thereby calculating the cumulative overall delay satisfaction rate of the data flow. The calculation process of the cumulative overall delay satisfaction rate includes:

A first number of transmitted data packets is counted. A second number of data packets that satisfy the cumulative transmission delay threshold in the transmitted data packets is counted. A ratio of the second number to the first number is calculated.

The last hop programmable switch sends a first warning signal to a control plane and uploading first warning inforamong time-sensitive data flows and improve the overall delay satisfaction of data flows as much as possible, which specifically includes:

A time-sensitive flow primitive is obtained, and the time-sensitive flow primitive is converted into a configuration recognizable by the programmable switches as a data flow task.

The time-sensitive flow primitive includes quintuple information of data flow, whether the flow is time-sensitive, initial priority, total delay requirement, single-step delay requirement of each hop programmable switch during transmission, whether lossless guarantee is needed, data flow transmission rate, etc., as shown in Table 1.

TABLE 1

| Time-sensitive flow submission primitives | |
|---|---|
| Primitive | Primitive meaning |
| Set_flow_info(srcIP, dstIP, srcport dstport, proto) | Set quintuple information of the data flow, the source IP address srcIP, destination IP address dstIP, the source port sreport, the destination port dstport, the protocol proto |
| Is_time_sensitive_flow(True/False) | Mark whether the data flow is time-sensitive or not |
| Set_initial_queue_priority($\mu_f^0$) | Mark the initial priority $\mu_f^0$ (optional) |
| Set_time_delay_total($\Delta_f$) | Set the total delay requirement $\Delta_f$ of the data flow |
| Set_time_delay_devide($\delta_{list}$) | Set the single-step delay requirement $\delta_{list}$ of each hop programmable switch during transmission (optional) |
| Set destructive_protection (True/False) | Whether lossless guarantee is required for setting |
| Set_rate($\sigma_f$) | Set the transmission rate of the data flow, that is, the bandwidth occupied by the data flow | mation if the cumulative overall delay satisfaction rate of the current data flow is lower than the cumulative overall delay satisfaction rate threshold. The first warning information includes data flow information and the cumulative overall delay satisfaction rate.

A monitor is set at each hop programmable switch (S1, S6, S10, S8, S4) on the transmission path of each data flow, and the transmission delay information of each data packet accumulated by the data flow on each hop programmable switch is recorded. If a difference between the transmission delay information of the current data flow in the current switch and the cumulative transmission delay threshold is greater than a difference threshold, the programmable switch sends a second warning signal to the control plane and uploads second warning information. The second warning information includes data flow information and transmission delay information.

After the first warning signal and/or the second warning signal are received, the control plane optimizes and adjusts the data flow according to the uploaded first warning information and/or the second warning information, including: if the cumulative overall delay satisfaction rate is not satisfied, the initial priority of the subsequent data packet of the data flow at the first hop programmable switch is increased; and/or expected delay parameters on each hop programmable switch are adaptively adjusted.

Further, the method of the present disclosure further includes:

For the application scenarios of a large number of time-sensitive flows submitted by multiple users in the network, a time-sensitive flow optimization model is constructed and solved in order to complete the path deployment of a large number of data flows with lossless requirements and delay requirements in polynomial time under the condition of limited network resources, so as to reduce the competition The time-sensitive flow primitive is converted into a configuration that can be recognized by the programmable switch as a data flow task. The expression is:

$$f=\{f_{id},\Xi_f,\tau_f,\mu_f^0,\delta_{list},\sigma_f,\overline{\omega}\},$$

where $f_{id}$ represents a data flow identifier, and $\Xi_f$={srcIP, dstIP, srcport, dstport, proto} is the quintuple information of the data flow. srcIP represents the source IP address, dstIP represents the destination IP address, srcport represents the source port, dstport represents the destination port, and proto represents the protocol. $\tau_f$ is the result of Is_time_sensitive_flow (True/False), which mark whether the data flow is time-sensitive or not. $\mu_f^0$ represents the initial priority. $\delta_{list}$ represents the single-step delay requirement of each hop programmable switch in the transmission process. $\sigma_f$ represents the transmission rate of the data flow, that is, the bandwidth occupied by the data flow. $\overline{\omega}$ is the result of Set_destructive_protection (True/False), which marks whether the data flow needs lossless guarantee.

In the calculation of bandwidth required by time-sensitive flows, in order to truly represent bandwidth resources occupied by different priorities, a weighted bandwidth coefficient ($\Lambda=\{\rho_{\mu_0}, \rho_{\mu_1}, \ldots \rho_{\mu_q}\}$) is introduced to correct bandwidths occupied by data flows with different priorities, and the calculation formula is: $b_f=\sigma_f\rho_{\mu_f^0}$.

A programmable switch network topology is constructed. The programmable switch network topology is recorded as a weighted directed graph=($V_G$, $E_G$, $L_G$, $C_G$), where $V_G$ represents a set of programmable switches in the network, $E_G$ is a set of directed links, Lc is a set $L_G=U_{v\in V_G}\gamma_v\cup U_{e\in E_G}\gamma_e$, where $\gamma_v$ is a transmission delay of switches and $\gamma_e$ is a transmission delay of links. $C_G$ is a set of available bandwidth for the programmable switches or links.

For each programmable switch $v \in V_G$, the transmission delay of the programmable switches is $\gamma_v$ and the available bandwidth is $b_e$. For each link $e \in E_G$, the available bandwidth is $b_e$ and the average transmission delay is $\gamma_e$. Because two programmable switches i and j are connected at the two ends of the link, when calculating the data flow path, the available bandwidth of the link is defined as the minimum available bandwidth of the programmable switches at both ends and the link, $C_e = \min\{b_e, b_{v_i}, b_{v_j}\}$.

For each data flow, the output result of the large-scale time-sensitive flow scheduling method is to plan a transmission path that can accommodate the data flow in the current network. Therefore, the output contains a set of Boolean variables: $\{\beta_e^f\}$, $e \in E_G$, $\beta_e^f = 1$ indicates that the path of the data flow f passes through the link e, and otherwise $\beta_e^f = 0$. At the same time, $\beta_e^f = 1$ further means that the path of the data flow f passes through the programmable switches at both ends of the link e, that is, $\delta_{v_i}^f = 1$ and $\delta_{v_j}^f = 1$.

An optimization objective, a first constraint, a second constraint and a third constraint are set, thereby constructing a time-sensitive flow optimization deployment model.

the optimization objective of the time-sensitive flow optimization deployment model is to minimize the remaining available bandwidths of all links in the network and reduce the resource competition among time-sensitive flows as much as possible, and the expression is:

$$\min\left(\frac{1}{|E_G|}\sum_{\forall e \in E_G}(\widetilde{C_e} - \overline{\widetilde{C_e}})^2\right)$$

where $\widetilde{C_e}$ is the remaining bandwidth of the link e after this path deployment, and $\overline{\widetilde{C_e}}$ is the average of the remaining available bandwidths of all links in the network, and the calculation formula is:

$$\overline{\widetilde{C_e}} = \frac{1}{|E_G|}\Sigma_{\forall e, e \in E_G}\widetilde{C_e}.$$

The constraints considered in the time-sensitive flow optimization deployment model include:

A first constraint: the planned path should satisfy the expected delay requirement: the transmission delays of all switches and links in the path should not be higher than the total delay requirement of the data flow f, and the expression is:

$$\sum_{\forall v \in V_G} \gamma_v \cdot \delta_v^f + \sum_{\forall e \in E_G} \gamma_e \cdot \beta_e^f \leq \Delta_f, \forall f \in \mathcal{F}$$

Further, as the network traffic tends to be stable, a control plane can detect the estimated delay of queues with different priorities on each switch, $\gamma_v = \{\gamma_{\mu_0}, \gamma_{\mu_1}, \dots, \gamma_{\mu_m}\}$, where $\mu_x$ is the priority x, $\mu_m$ is the highest priority supported in the system, and after considering the delays of different queues, the expression can be further updated and expressed as:

$$\sum_{\forall v \in V_G} \gamma_{\mu_f^0} \cdot \delta_v^f + \sum_{\forall e \in E_G} \gamma_e \cdot \beta_e^f \leq \Delta_f, \forall f \in \mathcal{F}$$

A second constraint: the proportion of the bandwidth required by time-sensitive flow in the total bandwidth of the switch: a scaling factor $$\chi_v^T = \frac{b_f \cdot \delta_v^f}{C_v}$$

is introduced to calculate the ratio $$\chi_v^T = \chi_v^{T0} + \frac{b_f \cdot \delta_v^f}{C_v}$$

of the bandwidth required by the time-sensitive flows deployed in each programmable switch v in the network to the total bandwidth of the switch one by one, and the maximum value should not be greater than the time-sensitive flow balance threshold k, and the expression is:

$$\chi_p^T = \max_{\forall v \in V_G}\{\chi_v^T \cdot \delta_v^f\}, \chi_p^T \leq k, \forall v \in V_G$$

A third constraint: link resource limitation: after the path is deployed, for the link $e \in E_G$, a total bandwidth occupied by the data flow $f \in \mathcal{F}$ deployed on the link should not be greater than the available bandwidth $\widetilde{C_e}^0$ of the original link, and the expression is:

$$\sum_{\forall f}\left\{\beta_e^f \cdot b_f \cdot \rho_{\mu_f^0}\right\} \leq \widetilde{C_e}^0, \forall e \in E_G, \forall f \in F$$

Based on data flow task and programmable switch network topology, the time-sensitive flow optimization deployment model is solved by a heuristic algorithm, and the path planning result of time-sensitive flow is obtained, which includes the following steps:

S1, data flow tasks are acquired, and the bandwidth resources required by the data flow are calculated based on the initial priority and a preset priority ratio parameter.

S2, the data flow tasks are sorted according to the required bandwidths.

S3, the data flow tasks are traversed one by one, all feasible route sets of the data flow in the programmable network are searched, the network resources consumed after deploying each feasible route are calculated, and the feasible route sets are sorted in an ascending order according to the consumed network resources.

S4, the feasible route sets are traversed one by one, an estimated delay caused by the feasible route and a ratio of the bandwidth required by the time-sensitive flow to the total bandwidth after allocating the feasible route are calculated based on the weighted bandwidth coefficient.

S5, for each feasible route, firstly, whether the delay caused by the route can satisfy a delay threshold and whether a proportion of time-sensitive flows on the programmable switches and the links is less than a set threshold parameter after the deploying feasible route are calculated.

a. if both are satisfied, the route is set as an optimal route.

b. otherwise, if the delay threshold is not satisfied, a next feasible route is obtained.

c. if the delay threshold requirement is satisfied but the proportion of time-sensitive flows is not satisfied, the feasible route is placed in a queue of alternative paths first, and if no optimal route is found after all feasible routes are traversed, the first one in alternative paths is selected as the optimal route.

If all feasible routes in the feasible route sets do not satisfy the delay threshold, that is, the queue of alternative feasible routes is empty, an error signal is triggered, and thus adjusting data flow requirements.

S6, the calculated optimal route corresponding to the current data flow task is recorded, the available resources in the network is updated, and the optimal route of a next data flow is calculated until the traversal of the data flow tasks is completed.

Aiming at the application scenes with a large number of time-sensitive flows, the present disclosure establishes the time-sensitive flow optimization model and its heuristic solution algorithm, which can distribute data flows with lossless requirements and delay requirements to different paths within polynomial time under the condition of limited network resources, thus reducing the competition among time-sensitive data flows and improving the overall delay satisfaction as much as possible.

Figure 6:
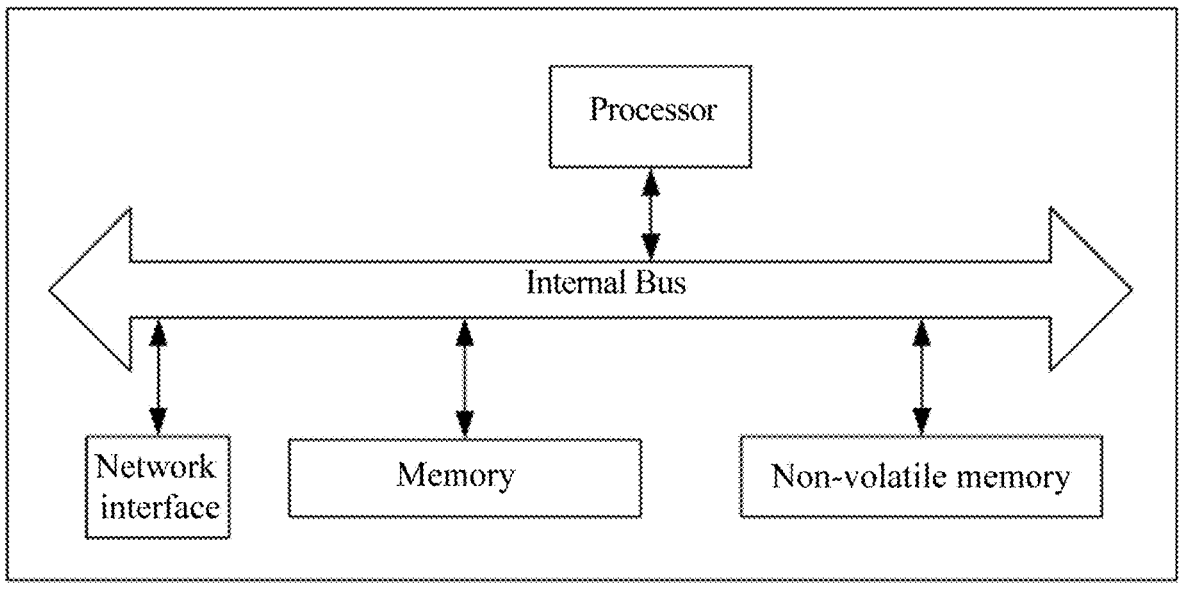
FIG. 6 is a schematic diagram of an electronic device provided by an embodiment of the present disclosure.

Correspondingly, the application further provides an electronic device, which includes one or more processors; a memory for storing one or more programs; when the one or more programs are executed by the one or more processors, the one or more processors implements the adaptive adjustment method of packet-level transmission priority for delay guarantee in programmable networks as described above. As shown in FIG. 6, it is a hardware structure diagram of any device with data processing capability where the adaptive adjustment method of packet-level transmission priority for delay guarantee in programmable networks provided by the embodiment of the present disclosure is located. In addition to the processor, memory and network interface shown in FIG. 6, any device with data processing capability in the embodiment can usually include other hardware according to the actual function of the device with data processing capability, which will not be repeated here.

Correspondingly, the application further provides a non-transitory computer-readable storage medium, on which computer instructions are stored, which, when executed by the processor, implements the above-mentioned adaptive adjustment method of packet-level transmission priority for delay guarantee in programmable networks. The non-transitory computer-readable storage medium can be an internal storage unit of any device with data processing capability as described in any of the previous embodiments, such as a hard disk or a memory. The non-transitory computer-readable storage medium can further be an external storage device, such as a plug-in hard disk, Smart Media Card (SMC), SD card, Flash Card and the like provided on the device. Further, the non-transitory computer-readable storage medium can further include both internal storage units and external storage devices of any device with data processing capability. The non-transitory computer-readable storage medium is used for storing the computer program and other programs and data required by any device with data processing capability, and can further be used for temporarily storing data that has been output or will be output.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The above embodiments are only used to illustrate the technical solution of the present disclosure, but not to limit it. Although the present disclosure has been described in detail with reference to the foregoing embodiments, those skilled in the art should understand that it is still possible to modify the technical solutions described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. An adaptive adjustment method of packet-level transmission priority for delay guarantee in programmable networks, comprising:

setting a transmission protocol and a control protocol for recording and transmitting data in a data packet transmission process;

configuring an intra-programmable switch priority adaptive adjustment mechanism, an inter-programmable switch priority adaptive adjustment mechanism and a global parameter adaptive adjustment mechanism;

wherein the intra-programmable switch priority adaptive adjustment mechanism comprises: acquiring a current data packet transmission state of a current data flow and a queue queuing situation based on the control protocol, and transmitting the data packet transmission state and the queue queuing situation from an egress pipeline of programmable switches to an ingress pipeline, and thereby adaptively adjusting a transmission priority of a data packet in the data flow inside the programmable switches;

wherein the inter-programmable switch priority adaptive adjustment mechanism comprises: acquiring historical transmission data comprising a cumulative transmission delay and a transmission priority during the data packet transmission process based on the transmission protocol; and when the data packet arriving at a downstream switch, comparing the cumulative transmission delay with a cumulative transmission delay threshold, and thereby adaptively adjusting the transmission priority of each data packet among the programmable switches; and wherein the global parameter adaptive adjustment mechanism comprises: calculating a cumulative overall delay satisfaction rate of transmitted data packets in the current data flow at the egress pipeline of a last hop programmable switch on a data flow transmission path; counting a transmission delay of each data packet on each hop programmable switch; and adaptively adjusting an initial priority of the current data flow and expected delay of the current data flow in each hop programmable switch; and implementing collaboratively packet-level transmission delay guarantee at different locations in a programmable network with different time scales by the intra-programmable switch priority adaptive adjustment mechanism, the inter-programmable switch priority adaptive adjustment mechanism and the global parameter adaptive adjustment mechanism.

2. The adaptive adjustment method of packet-level transmission priority for delay guarantee in programmable networks according to claim 1, wherein the transmission protocol comprises a data flow identifier flow_id, a switch serial number switch_index on the data flow transmission path, a time-sensitive flow flag split_flag, an initial priority initial_priority, a current priority inherited_priority, a cumulative transmission delay total_delay, a lossless flag lossless_flag, and a next protocol type protoc_type; and the control protocol comprises a control queue protocol and a data flow status protocol;

wherein the control queue protocol comprises a control queue flag carry_queue_flag, a switch port number port, a queue number queue_id, a queue state queue_state and a next protocol protoc_type; and wherein the data flow status protocol comprises a data flow status flag carry_flowstate_flag, a data flow identifier flow_id, a switch serial number switch_index on the data flow transmission path, a flow state flow_state and a next protocol protoc_type.

3. The adaptive adjustment method of packet-level transmission priority for delay guarantee in programmable networks according to claim 1, wherein a process of monitoring a current data flow state in the intra-programmable switch priority adaptive adjustment mechanism comprises:

recording the transmission delay of each data packet in the data flow via the ingress pipeline, a traffic management and the egress pipeline in the programmable switches;

presetting a transmission delay threshold in the programmable switches corresponding to the data flow;

comparing the transmission delay of each data packet with the transmission delay threshold at the egress pipeline of the programmable switches;

mirroring the current data packet by using a monitor configured at the egress pipeline of the programmable switches when transmission delay of several data packets in the data flow being greater than the transmission delay threshold; and embedding the data flow status protocol into the mirrored data packet by using a constructor configured at the egress pipeline of the programmable switches, and transmitting the data packet from the egress pipeline of the programmable switches to the ingress pipeline, and storing the current data packet transmission state of the data flow in a corresponding register; and wherein a process of monitoring the queue queuing situation of port queues in the intra-programmable switch priority adaptive adjustment mechanism comprises:

acquiring first n data packets, and mirroring the first n data packets by using the monitor configured at the egress pipeline of the programmable switches, where n is a positive integer, indicating a quantity of queues;

embedding the control queue protocol into the mirrored n data packets by using the constructor configured at the egress pipeline of the programmable switches, and transmitting the n data packets from the egress pipeline to the ingress pipeline of the programmable switches, and storing a current queue queuing situation in the corresponding register; and circulating the n data packets in the programmable switches via the ingress pipeline, the traffic management and the egress pipeline to monitor the current queue queuing situation in real time.

4. The adaptive adjustment method of packet-level transmission priority for delay guarantee in programmable networks according to claim 1, wherein a step of acquiring the current data packet transmission state of the current data flow and the queue queuing situation, and thereby adaptively adjusting the transmission priority of the data packet in the data flow inside the programmable switches comprises:

acquiring, at the ingress pipeline, the corresponding current data packet transmission state of the flow and the current queue queuing situation of the programmable switches;

when the current data packet transmission state of the data flow being high than the transmission delay threshold in the programmable switches, increasing the transmission priority of the current data packet, determining whether a transmission queue to be adjusted being congested, and when the transmission queue to be adjusted being not congested, adjusting the current data packet to this queue; and when the current data packet transmission state of the data flow being low than the transmission delay threshold in the programmable switches, reducing correspondingly the transmission priority of the current data packet.

5. The adaptive adjustment method of packet-level transmission priority for delay guarantee in programmable networks according to claim 1, wherein the inter-programmable switch priority adaptive adjustment mechanism further comprises:

when the data packet entering a first hop programmable switch of the programmable network, embedding the transmission protocol into the data packet; updating and recording the historical transmission data of the data packet in the data packet transmission process, wherein the historical transmission data comprises a data flow identifier, a switch serial number on the data flow transmission path, a time-sensitive flow flag, an initial priority, a current priority, a cumulative transmission delay, a lossless flag and a next protocol type; and when the data packet arriving at a next hop programmable switch, comparing cumulative transmission delay carried by the transmission protocol in the data packet with the cumulative transmission delay threshold stored in a register; when the cumulative transmission delay being higher than the cumulative transmission delay threshold, increasing the transmission priority of the data packet, determining whether a transmission queue to be adjusted being congested, and when the transmission queue to be adjusted being not congested, adjusting the current data packet to the transmission queue; and when the cumulative transmission delay being lower than the cumulative transmission delay threshold, reducing accordingly the transmission priority;

wherein an update mode of a cumulative transmission delay field in the transmission protocol comprises: cumulative delay update inside the programmable switches and/or cumulative delay update of all processing times comprising an internal delay and a link delay of the programmable switches.

6. The adaptive adjustment method of packet-level transmission priority for delay guarantee in programmable networks according to claim 1, wherein the global parameter adaptive adjustment mechanism further comprises:

providing a monitor at the last hop programmable switch on each data flow transmission path to count transmission delay information of the transmitted data packets in the data flow, and calculating the cumulative overall delay satisfaction rate of the data flow, wherein said calculating the cumulative overall delay satisfaction rate of the data flow comprises:

counting a first number of the transmitted data packets; counting a second number of data packets that satisfy the cumulative transmission delay threshold in the transmitted data packets; and calculating a ratio of the second number to the first number;

sending, by the last hop programmable switch, a first warning signal to a control plane and uploading first warning information when the cumulative overall delay satisfaction rate of the current data flow being lower than an overall delay satisfaction rate threshold, wherein the first warning information comprises first data flow information and the cumulative overall delay satisfaction rate;

providing a monitor at each hop programmable switch on each data flow transmission path, and recording the transmission delay information of each data packet accumulated by the data flow on each hop programmable switch; and when a difference between the transmission delay information of the current data flow in a current programmable switch and the cumulative transmission delay threshold being greater than the difference threshold, sending, by the current programmable switch, a second warning signal to the control plane and uploading second warning information, wherein the second warning information comprises second data flow information and the transmission delay information; and after receiving the first warning signal and/or the second warning signal, optimizing and adjusting, by the control plane, the data flow according to the first warning information and/or the second warning information, comprising: when not satisfying the cumulative overall delay satisfaction rate, increasing the initial priority of a subsequent data packet of the data flow at a first hop programmable switch; and/or adaptively adjusting expected delay parameters on each hop programmable switch.

7. The adaptive adjustment method of packet-level transmission priority for delay guarantee in programmable networks according to claim 1, wherein the adaptive adjustment method further comprises a process of constructing a time-sensitive flow optimization deployment model, and solving the time-sensitive flow optimization deployment model by a heuristic algorithm to obtain a path planning result of time-sensitive flows, comprising:

acquiring a time-sensitive flow primitive, and converting the time-sensitive flow primitive into a configuration recognizable by the programmable switches as a data flow task;

constructing a programmable switch network topology;

setting an optimization objective, a first constraint, a second constraint and a third constraint, thereby constructing the time-sensitive flow optimization deployment model; and solving, by the heuristic algorithm, the time-sensitive flow optimization deployment model based on the data flow task and the programmable switch network topology, and obtaining the path planning result of the time-sensitive flow.

8. The adaptive adjustment method of packet-level transmission priority for delay guarantee in programmable networks according to claim 7, wherein said acquiring a time-sensitive flow primitive, and converting the time-sensitive flow primitive into a configuration recognizable by the programmable switches as a data flow task comprises:

the data flow task has a following expression:

$$f=\{f_{id},\Xi_f,\tau_f,\mu_f^{\,0},\delta_{list},\sigma_f,\overline{\omega}\},$$

where $f_{id}$ represents a data flow identifier, $\Xi_f=\{srcIP,dstIP, srcport,dstport,proto\}$ represents quintuple information of the data flow, srcIP represents a source IP address, dstIP represents a destination IP address, srcport represents a source port, dstport represents a destination port, proto represents a protocol, $\tau_f$ represents whether the data flow is time-sensitive, $\mu_f^{\,0}$ represents an initial priority, $\delta_{list}$ represents a single-step delay requirement of each hop programmable switch in the data packet transmission process, $\sigma_f$ represents a transmission rate of the data flow, namely a bandwidth occupied by the data flow, and $\overline{\omega}$ represents whether the data flow requires lossless protection, wherein bandwidths occupied by data flows with different priorities are corrected by introducing a weighted bandwidth coefficient $\Lambda=\{\rho_{\mu_0}, \rho_{\mu_1}, \ldots \rho_{\mu_\phi}\}$ to truly represent bandwidth resources occupied by the different priorities during calculating a bandwidth required by the time-sensitive flow, and a calculation formula is expressed as follows: $b_f=\sigma_f\rho_{\mu_f^0}$;

the programmable switch network topology is constructed with a following expression:

$$G=(V_G,E_G,L_G,C_G)$$

where $V_G$ represents a set of programmable switches in the programmable switch network topology, $E_G$ represents a set of directed links, $L_G$ represents a set of transmission delay of the programmable switches or links, and $C_G$ represents the available bandwidth of the programmable switches or the links;

the optimization objective of the time-sensitive flow optimization deployment model has a following expression:

$$\min\left(\frac{1}{|E_G|}\sum_{\forall e \in E_G}(\widetilde{C_e} - \overline{\widetilde{C_e}})^2\right)$$

where $\widetilde{C_e}$ represents a remaining bandwidth of a link e after a path deployment, and $\overline{\widetilde{C_e}}$ represents an average of remaining available bandwidths of all links in the programmable network;

the first constraint of the time-sensitive flow optimization deployment model is an expected delay requirement constraint, with a following expression:

$$\sum_{\forall v \in V_G} \gamma_v \cdot \delta_v^f + \sum_{\forall e \in E_G} \gamma_e \cdot \beta_e^f \le \Delta_f, \forall f \in \mathcal{F}$$

where $\gamma_v$ represents a transmission delay of the programmable switches v, $\gamma_e$ represents a transmission delay of the link e, $\delta_v^f$ represents whether a path of a data flow f passes through a switch v, and $\beta_e^f$ represents whether the path of the data flow f passes through the link e;

the second constraint of the time-sensitive flow optimization deployment model is a ratio constraint of the bandwidth required by the time-sensitive flow to a total bandwidth of the programmable switches, with a following expression:

$$\chi_p^T = \max_{\forall v \in V_G}\{\chi_v^T \cdot \delta_v^f\}, \chi_p^T \le k, \forall v \in V_G$$

where $\chi_v^T$ represents a ratio of the bandwidth required by the time-sensitive flow deployed to the total bandwidth of each programmable switch v; and $\chi_p^T$ represents a maximum value of the ratio of the bandwidth required by the time-sensitive flow deployed to the total bandwidth in each programmable switch v in a path p; and the third constraint of the time-sensitive flow optimization deployment model is a switch link resource constraint, with a following expression:

$$\sum_{\forall f}\left\{\beta_e^f \cdot b_f \cdot \rho_{\mu_f^0}\right\} \le \widetilde{C_e^0}, \forall e \in E_G, \forall f \in \mathcal{F}$$

where $\rho_{\mu_f^0}$ represents a weighted bandwidth coefficient; and wherein said solving, by the heuristic algorithm, the time-sensitive flow optimization deployment model based on the data flow task and the programmable switch network topology, and obtaining the path planning result of the time-sensitive flow comprises:

acquiring data flow tasks, and calculating the bandwidth resources required by the data flow based on the initial priority and a preset priority ratio parameter;

sorting the data flow tasks based on the required bandwidths;

traversing the data flow tasks one by one, searching for all feasible route sets of the data flow in the programmable network, calculating network resources consumed after deploying each feasible route, and sorting the feasible route sets in an ascending order based on the consumed network resources;

traversing the feasible route sets one by one, calculating an estimated delay caused by the feasible route and a ratio of the bandwidth required by the time-sensitive flow to the total bandwidth after allocating the feasible route based on the weighted bandwidth coefficient;

for each feasible route, calculating whether the delay caused by the feasible route satisfying a delay threshold, and whether a proportion of time-sensitive flows on the programmable switches and the links being less than a set threshold parameter after deploying the feasible route; when both being satisfied, setting the feasible route as an optimal route; otherwise, when the delay threshold being not satisfied, obtaining a next feasible route; when the delay threshold being satisfied but the proportion of time-sensitive flows being not satisfied, placing the feasible route in a queue of alternative paths first, and when no optimal route being found after all feasible routes being traversed, selecting the first one in alternative paths as the optimal route; and when all feasible routes in the feasible route sets not satisfying the delay threshold, namely the queue of alternative feasible routes being empty, triggering an error signal, and thus adjusting data flow requirements; and recording the calculated optimal route corresponding to the current data flow task, updating available resources in the programmable network, and calculating an optimal route of a next data flow until achieving traversal of the data flow tasks.

9. An electronic device, comprising a memory and a processor, wherein the memory is coupled with the processor; wherein the memory is configured to store program data, and the processor is configured to execute the program data to implement the adaptive adjustment method of packet-level transmission priority for delay guarantee in programmable networks according to claim 1.

10. A non-transitory computer-readable storage medium on which a computer program is stored, wherein the program, when executed by a processor, is configured to implement the adaptive adjustment method of packet-level transmission priority for delay guarantee in programmable networks according to claim 1.

* * * * *